United States Patent [19]

Waters

[11] Patent Number: 4,680,001

[45] Date of Patent: Jul. 14, 1987

[54] PASSIVE MOLD COOLING AND HEATING SYSTEM

[75] Inventor: Michael A. Waters, Elk Grove Village, Ill.

[73] Assignee: Application Engineering Corporation, Wood Dale, Ill.

[21] Appl. No.: 827,827

[22] Filed: Feb. 10, 1986

Related U.S. Application Data

[62] Division of Ser. No. 675,877, Nov. 28, 1984, Pat. No. 4,623,497.

[51] Int. Cl.$^4$ .............................................. B29C 33/04
[52] U.S. Cl. .............................. 425/144; 165/104.21; 425/29; 425/526; 425/552; 425/407
[58] Field of Search ............... 425/144, 143, 552, 526, 425/29, 407, 547; 264/40.6, 328.16; 165/104.21, 96

[56] References Cited

U.S. PATENT DOCUMENTS

| | | | |
|---|---|---|---|
| 2,363,118 | 11/1944 | Chamberlain | 165/104.21 |
| 3,259,175 | 7/1966 | Kraus et al. | 425/144 |
| 3,836,779 | 9/1974 | Bruno et al. | 165/104.21 |
| 3,855,449 | 12/1974 | Schneider | 165/104.21 |
| 4,072,181 | 2/1978 | Kostura et al. | 425/144 |
| 4,314,601 | 2/1982 | Giuffre et al. | 165/104.21 |

OTHER PUBLICATIONS

*Perry's Chemical Engineers' Handbook*, McGraw—Hill Book Co., NY, NY, 4th ed., pp. 4-55.

Primary Examiner—Jay H. Woo
Assistant Examiner—James C. Housel
Attorney, Agent, or Firm—Kinzer, Plyer, Dorn & McEachran

[57] ABSTRACT

A mold for molding articles of plastic or other like materials, having a plurality of vertically extending internal passages, is connected by inlet and return conduits into a closed loop that includes a heat exchanger partially filled with a liquid supply of a cooling fluid or a heating fluid. For cooling the heat exchanger is positioned with its liquid level above the top of the mold, the inlet conduit connects the lower part of the heat exchanger, below the liquid level, to the lower ends of the mold passages, and the return conduit connects the upper ends of the mold passages to the upper part of the heat exchanger; for heating these relationships are reversed. In operation the fluid changes its physical state at critical points in the mold passages, going from liquid to vapor for cooling and from vapor to liquid for heating; circulation in the closed loop is in response to the effect of gravity. Operation of the heat exchanger is controlled to maintain a controlled pressure in the closed loop.

11 Claims, 3 Drawing Figures

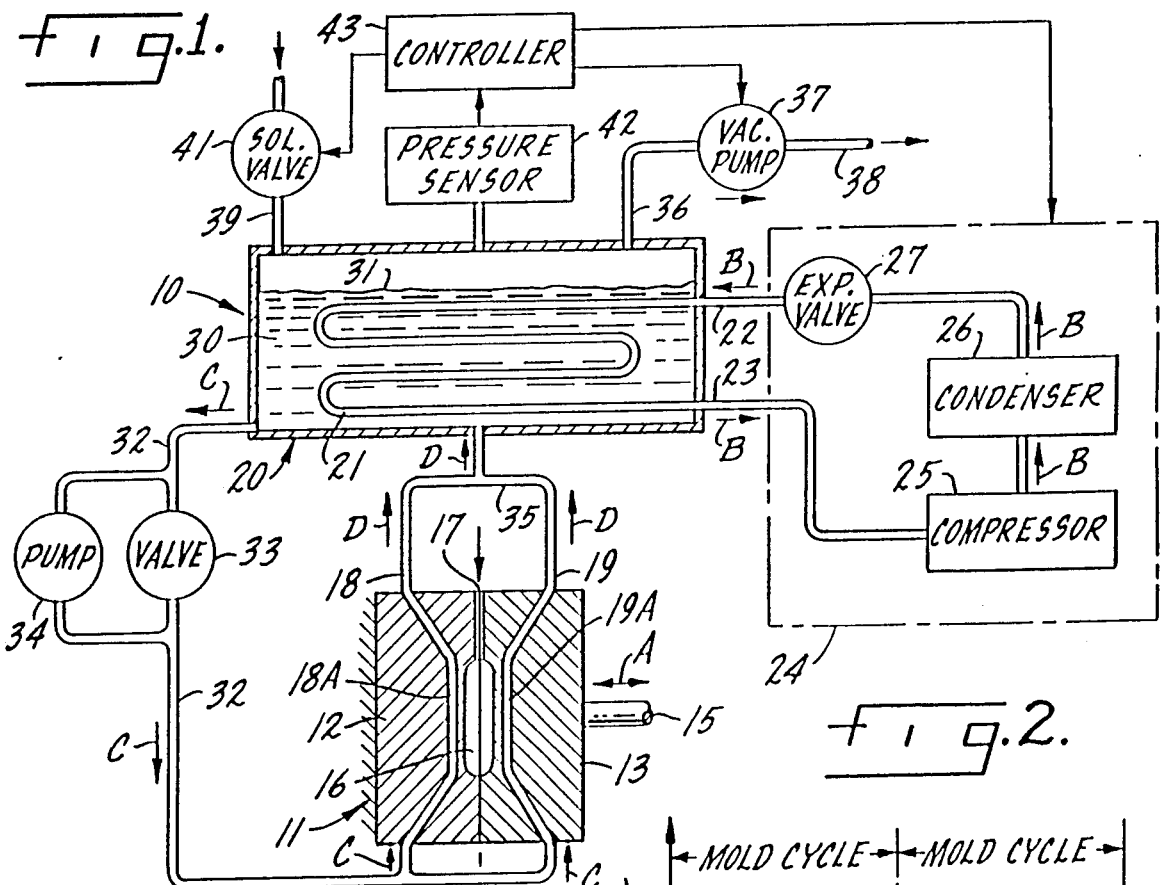
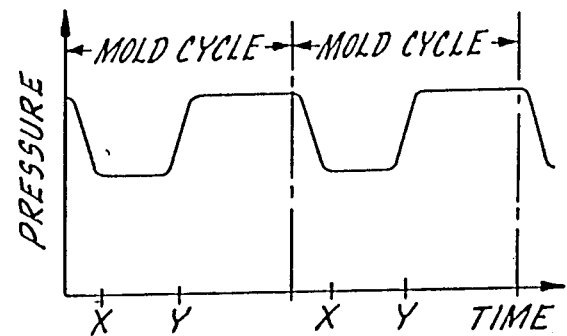
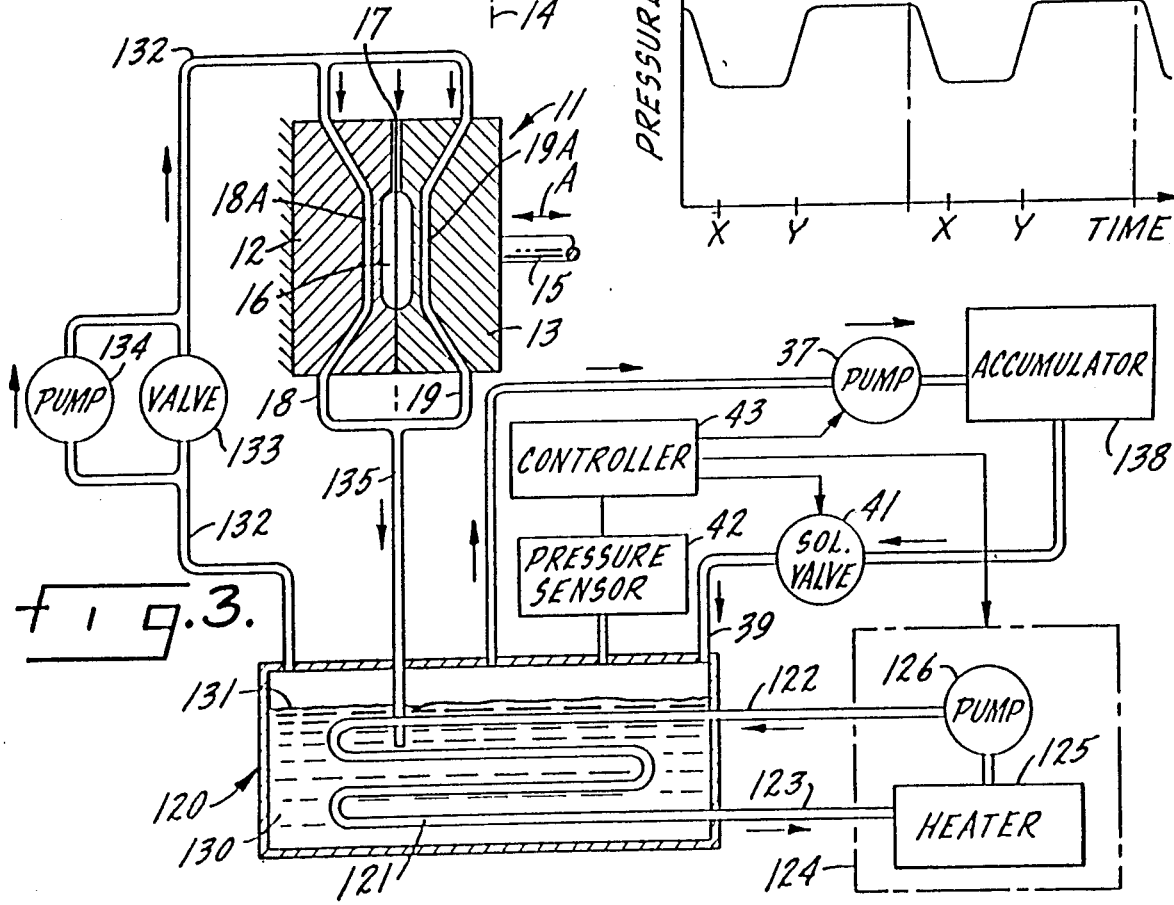

PASSIVE MOLD COOLING AND HEATING SYSTEM

This is a division of application Ser. No. 675,877 filed Nov. 28, 1984, now U.S. Pat. No. 4,623,497.

BACKGROUND OF THE INVENTION

In the molding of articles of plastic and other like materials, as in injection molding, blow molding, rotational molding, compression molding, reaction injection molding and other processes, efficient operation of the molding process depends upon effective control of thermal conditions in the mold. Thus, in many plastic molding processes relatively rapid cooling of the mold to a temperature at which the molded article can be removed without distortion is a critical part of the process. In other plastic molding procedures, on the other hand, it is necessary to heat the mold in a rapid and controlled manner to achieve acceptable efficiency levels. If the techniques employed for cooling (or heating) of the molding apparatus are too slow, the molding equipment must be slowed down to a speed that is economically undesirable. On the other hand, excessively rapid thermal changes in the mold may lead to poor quality in the molded articles.

In those molding processes in which the molded article must be cooled in the mold prior to removal, it has been conventional practice to provide a series of passages for passing a cooling liquid through the mold, at least some of the cooling passages being located quite close to the mold cavity or cavities. Chilled water or other cooling liquid circulated through these mold passages cools the mold and the molded article so that the article can be removed from the mold without distortion. This procedure is inherently somewhat inefficient because a large volume of cooling liquid must be circulated through the mold to achieve the desired cooling. This conventional procedure is also rather difficult to control so as to achieve a maximum cooling rate without cooling the mold too much, which may interfere with efficient operation of the mold in the next cycle. Moreover, the conventional cooling technique is inherently non-selective; most of the mold is cooled, but it is far more desirable to concentrate cooling in that portion of the mold immediately adjacent to the mold cavity. In those processes that require heating of a mold the same basic techniques are conventionally employed, except that the circulated fluid is a hot liquid. The same problems are presented.

SUMMARY OF THE INVENTION

The present invention relates to a new and improved passive system for cooling or heating a mold used in molding articles of plastic or other like materials without pumping large quantities of liquid through passages in the mold for this purpose; the system utilizes the latent heat of vaporization (or condensation) of a heat transfer fluid for improved efficiency and achieve circulation through passages in the mold and through the balance of the system in response to the effect of gravity.

It is a principal object of the present invention, therefore, to provide a new and improved passive mold cooling and heating system in which efficient and selective heat transfer is obtained, within a mold for the molding of articles from plastic or like materials, by utilizing the latent heat of vaporization or condensation of a heat transfer fluid circulated through internal passages in the mold by gravitational effects, without requiring pumping of large volumes of liquid through the mold.

A related object of the invention is to provide a new and improved passive mold cooling and heating system that is simple and economical yet highly reliable in operation and that can be controlled to optimize the molding process.

In one specific aspect, the invention relates to a passive cooling system for cooling a mold for molding articles of plastic or like material without substantial pumping, the mold including a plurality of vertically extending internal passages for passing a cooling fluid through the mold. The cooling system comprises a condenser heat exchanger partially filled with a supply of cooling fluid in a liquid state, the cooling fluid constituting a fluid which changes from its liquid state to its vapor state in response to temperatures occurring in critical portions of the mold passages during operation of the mold, and the heat exchanger being positioned so that the upper level of liquid in the heat exchanger is approximately at or above the top of the mold. An inlet conduit connects the heat exchanger, from a point below the upper level of the fluid, to the lowermost ends of the mold passages, and a return conduit connects the upper ends of the mold passages back to the heat exchanger; the heat exchanger, the mold passages, and the inlet and return conduits constitute a closed loop. The system further comprises control means for controlling operation of the heat exchanger to maintain a controlled pressure in the loop while condensing vaporized fluid back to its liquid state as the fluid returns from the mold to the heat exchanger; the heat exchanger control means includes means to adjust the controlled pressure to establish a minimum limit temperature for cooling of the mold and means for actuating the heat exchanger to vary the loop pressure in synchronism with the molding cycle.

In another specific aspect, the invention relates to a passive heating system for heating a mold for molding articles of plastic or like material without substantial pumping, the mold including a plurality of vertically extending internal passages for passing a heating fluid through the mold. The heating system comprises an evaporator heat exchanger partially filled with a supply of heating fluid in a liquid state, the heating fluid constituting a fluid which changes from its vapor state to its liquid state in response to temperatures occurring in critical portions of the mold passages during operation of the mold, and the heat exchanger being positioned so that the upper level of liquid fluid in the heat exchanger is approximately at or below the bottom of the mold. An inlet conduit connects the heat exchanger, from a point above the upper level of the fluid, to the upper ends of the mold passages, and a return conduit connects the lower ends of the mold passages back to the heat exchanger; the heat exchanger, the mold passages, and the inlet and return conduits constitutes a closed loop. The system further comprises means for controlling operation of the heat exchanger to vaporize fluid from the liquid supply in the heat exchanger to maintain the conduits and the mold passages filled with vapor at a controlled pressure; the heat exchanger control means includes means to adjust the pressure to establish a maximum limit temperature for heating of the mold and means for actuating the heat exchanger to vary the loop pressure in synchronism with the molding cycle.

BRIEF DESCRIPTION OF THE DRAWINGS

FIG. 1 is a schematic illustration of a passive mold cooling system constructed in accordance with one embodiment of the invention;

FIG. 2 is a graph showing pressure variations employed in one mode of operation of the system of FIG. 1; and FIG. 3 is a schematic illustration of a passive mold heating system constructed in accordance with another embodiment of the invention.

DESCRIPTION OF THE PREFERRED EMBODIMENTS

FIG. 1 is a schematic illustration of a passive cooling system 10 for cooling a mold 11 employed to mold articles of plastic or like material in a molding process that requires cooling of the molded article prior to its removal from mold 11. Mold 11, in the illustrated system, is of the general kind used in injection molding machines and similar equipment. It comprises a fixed mold half 12 and a removable mold half 13, the parting line of the mold being generally indicated by the phantom line 14. The mechanism for moving mold half 13 into and out of the illustrated closed position, which operates in accordance with a predetermined mold timing cycle, is generally illustrated by a piston rod 15. The arrows A show the direction of movement for mold half 13.

In the center of mold 11 there is a mold cavity 16, a part of cavity 16 being formed in each of the mold halves 12 and 13. A fill passage 17 in mold 11 permits the feeding of raw plastic or like material into mold cavity 16. The fixed mold half 12 is provided with a plurality of internal passages 18 that extend through this half of mold 11 in a vertical direction (only one passage 18 is shown). Similarly, the movable mold half 13 includes a plurality of vertically extending internal passages 19, only one passage 19 being illustrated. In both mold halves, the internal passages 18 and 19 pass quite close to mold cavity 16.

It will be recognized that the illustration of mold 11 has been substantially simplified. Mold 11 may include a plurality of mold cavities 16, which may all be of the same shape or may be of differing configurations. For purposes of the present invention, passages 18 and 19 must extend generally vertically through mold 11, but they need not have the illustrated configuration; sharper bends in these passages are permissible. The simple fill passage 17 may be much more complex in configuration.

Cooling system 10 further comprises a heat exchanger 20, which in this instance is employed as a condenser. Heat exchanger 20 includes an internal coil 21 having an inlet 22 and an outlet 23. Coil 21 is connected to a cooling source 24, shown as a conventional refrigeration system. Thus, in simplified form, cooling source 24 is shown as comprising a compressor 25, a condenser 26, and an expansion valve 27. Expansion valve 27 is connected to the inlet 22 of coil 21 and the outlet 23 of coil 21 is returned to compressor 25. The arrows B indicate the direction of flow of refrigerant through the closed system comprising coil 21 and refrigerating apparatus 24. Other cooling systems may be substituted for the illustrated refrigeration apparatus of cooling source 24.

In system 10, heat exchanger 20 is partially filled with a supply of cooling fluid in its liquid state. The cooling fluid 30 may be water, usually with some additives to prevent rust, etc.; the use of water is assumed in the following description of system 10. On the other hand, the heat transfer fluid 30 may also constitute a conventional refrigerant such as the commercially available R-12, R-22, or R-114 Freon refrigerants. Heat exchanger 20 should be positioned with the upper level 31 of the liquid coolant supply 30 approximately at and preferably above the top of mold 11, for reasons to be made apparent in the operational description of system 10. An inlet conduit 32 connects heat exchanger 20 to the lower ends of the passages 18 and 19 through mold 11. At heat exchanger 20, the connection for inlet conduit 32 should be made at a point well below the upper level 31 of the supply of cooling liquid 30 in the heat exchanger. A valve 33 may be interposed in inlet conduit 32 and a pump 34 may be connected in parallel with valve 33.

A return conduit 35 connects the upper ends of mold passages 18 and 19 back to heat exchanger 20. At the heat exchanger end, the connection from return conduit 35 is made at a point above the upper level 31 of the cooling liquid. Mold passages 18 and 19, heat exchanger 20, inlet conduit 32, and return conduit 35 constitute a closed loop; this loop should be effectively sealed to permit control of pressure within the loop.

A vent conduit 36 connects the top of heat exchanger 20 to a vacuum pump 37. Pump 37 is shown with an external connection 38 to the atmosphere, an arrangement that is quite suitable when water is used as the cooling fluid 30. The top of heat exchanger 20 is also connected to the atmosphere through another conduit 39 that includes a solenoid actuated valve 41.

A pressure sensor 42 is incorporated in system 10 to sense the internal pressure in the closed loop system comprising heat exchanger 20, mold passages 18 and 19, and conduits 32 and 35. In FIG. 1 pressure sensor 42 is shown connected to the top of heat exchanger 20, but it could be connected to return conduit 35 or to some other point in the loop. Pressure sensor 42 is connected to an electrical controller 43 that is electrically connected to pump 37. Controller 43 also has an electrical connection to valve 41. In many systems, it is also desirable to provide a third control connection from controller 43 to refrigerating apparatus 24.

Before starting operation, the passive mold cooling system 10 is connected as shown in FIG. 1 and heat exchanger 20 is partially filled with the heat transfer fluid 30, to level 31. For present purposes it is assumed that the heat transfer liquid is water. With valve 33 open, a limited quantity of the water flows through inlet conduit 32 and up into passages 18 and 19 in mold 11. To assure complete filling of the mold passages and conduits 32 and 35 with the heat transfer liquid, however, valve 33 is closed and pump 34 is actuated to pump the cooling liquid through the closed loop as indicated by the arrows C and D. This is also effective to purge the closed loop system of any entrapped air. Once the closed loop has been purged and filled with cooling liquid 30, pump 34 may be shut off and valve 33 opened.

The operation of system 10 is based on utilization of the latent heat of vaporization of the cooling liquid 30 (water). It is also intended to provide maximum cooling on a selective basis at critical portions of the mold passages 18 and 19, the portions 18A and 19A of those passages most closely adjacent to mold cavity 16. For efficient operation, it is desirable to exercise control over the flash temperature of the cooling liquid. This is accomplished by adjusting the pressure within heat exchanger 20 to a predetermined level; that pressure may then be maintained relatively constant during operation of system 10. Assuming that the desired pressure within the closed loop system is below atmospheric, to afford a flash temperature below 212° F., pressure sensor 42 and controller 43 actuate pump 37 to pump air out of heat exchanger 20 until the desired pressure is attained. For any overshoot below the desired pressure, pressure sensor 42 and controller 43 react to shut off pump 37 and open valve 41 until the desired pressure level is reached.

Thereafter, in general, there may be no pumping of cooling liquid in the operation of system 10. When mold 11 is closed by operation of piston 15 and heated plastic is injected into mold cavity 16 through fill passage 17, the walls of the mold cavity are heated and this heat is conducted to the closely adjacent critical portions 18A and 19A of the mold cooling passages. The hot critical portions 18A and 19A of the mold passages vaporize the water. This produces rapid cooling at the hottest points in mold 11 without undue cooling of other portions of the mold. Heat absorption is highly efficient, due to the utilization of the latent heat of vaporization of the cooling fluid. The vaporized cooling fluid (steam) rises through passages 18 and 19 and passes through return conduit 35 to bubble up through the liquid coolant supply 30 in heat exchanger 20. The refrigerating apparatus 24 circulates refrigerant through coil 21, continuously condensing the vaporized cooling fluid 30 back to its liquid state.

During operation of system 10, the pressure and temperature of the cooling liquid 30 are continuously regulated; in some systems, pressure control may be adequate. Thus, the control comprising pressure sensor 42 and controller 43 may actuate pump 37 and valve 41 to maintain the pressure within heat exchanger 20, and in the complete closed loop of which the heat exchanger 20 is a part, at a constant level. On the other hand, a similar control may be exercised by regulation of the operation of refrigerating apparatus 24, controlling the rate of cooling for condenser 20. In some systems, it may be desirable to employ both control techniques conjointly.

Completely passive operation of system 10, as described, may be highly effective and efficient. In some instances, however, the rate of movement of vaporized cooling fluid upwardly through passages 18 and 19 and conduit 35 due to the effect of gravity may be inadequate so that there is a tendency for vapor bubbles to accumulate in the mold passages In these circumstances, it may be desirable to operate pump 34 at a low level to provide a slow circulation of liquid through the closed loop as indicated by arrows C and D, thereby assuring effective transfer of heat from the critical portions 18A and 19A of the mold passages to condenser 20.

In system 10, virtually no cooling action takes place below the vaporization temperature of the cooling fluid 30. Thus, if the cooling fluid is water and the pressure in the system is nominal atmospheric, system 10 will not cool mold 11 below 212° F. This is of substantial advantage in preventing undue cooling of the mold, a common problem in conventional cooling systems. The cooling effect is quite selective, with the vaporization of the cooling liquid taking place almost entirely in those portions 18A and 19A of the mold passages that are immediately adjacent to mold cavity 16. This materially reduces the inefficiency associated with excessive transfer of heat from other portions of mold 11 to condenser 20.

In the foregoing description of the operation of system 10 (FIG. 1) it is assumed that the pressure in the closed loop formed by elements 20, 32, 18 and 19, and 35 is held constant. For some systems, that mode of operation may not produce optimum results. For further improvement in the operation and to obtain high quality molded articles with a minimum molding cycle, in at least some systems it may be desirable to reduce the pressure, cyclically, in the closed loop during the critical portion of the molding cycle when the mold has closed and hot plastic is introduced into the mold, in order to accelerate vaporization of the heat-transfer fluid and cooling of the critical portions 18A and 19A of the mold passages.

This mode of operation can best be understood by reference to FIG. 2, in which loop pressure is plotted as a function of molding cycle time. In FIG. 2, point X in each mold cycle indicates the time that the mold is closed and filling of the mold cavity with hot plastic commences. Point Y in each mold cycle represents the time that the mold begins to open.

Shortly before time X in each mold cycle (FIG. 2), controller 43 actuates pump 37 to effect a substantial reduction in the pressure in heat exchanger 20, and hence in the closed loop including the mold cooling passages 18 and 19. This initiates vaporization within the mold (during operation, the mold is hotter than any other part of the closed loop system). This produces an appreciable temperature differential between the critical mold passage portions 18A, 19A and the mold cavity 16 immediately prior to filling of the mold. Shortly before the mold opens (point Y) the pressure is restored to its original level. In this manner, the heat transfer process is synchronized with the molding operation for optimum results, while avoiding undue cooling during those portions of the mold cycle when the mold is open.

FIG. 3 affords a schematic illustration of a passive heating system 110 that utilizes the same basic operational principles as the passive cooling system 10 of FIG. 1. As before, the passive heating system 110 is utilized for thermal control of a mold 11 used for molding articles of plastic or like material, mold 11 including fixed and movable mold halves 12 and 13 affording one or more mold cavities 16 into which plastic is fed through appropriate passages 17, the mold actuation mechanism being indicated only by the piston rod 15 for mold half 13. Again, the mold is provided with multiple internal passages 18 and 19; in this instance the passages are utilized to heat the mold.

A heat exchanger 120 is included in system 110, FIG. 3, and includes an internal coil 121 having an inlet 122 and an outlet 123. The outlet 123 is connected to a heater 125 in a conventional heating apparatus 124 that also includes a pump 126 connected back to the inlet 122 of coil 121. Heat exchanger 130 functions as an evaporator in system 110. Accordingly, the closed system comprising heating apparatus 124 circulates hot water or other heating fluid through coil 121 in evaporator 120.

The controls for heat exchanger 120 may be the same as in the previously described system, comprising a vent conduit 36 connected to a pump 37. In this instance the outlet of pump 37 is connected to a storage vessel or accumulator 138 rather than to the atmosphere. Accumulator 138 is connected to a solenoid actuated valve 41 in an inlet conduit 39 returned to the interior of evaporator 120. Pressure control is provided by a pressure sensor 42 and controller 43 with the controller 43 actuating pump 37 and valve 41. Controller 43 may also be used to control operation of heating apparatus 124. Evaporator 120 is partially filled with a heating fluid 130, in its liquid state, to an upper level 131. Fluid 130 may be water, a commercial refrigerant, or other fluid.

An inlet conduit 132 connects heat exchanger 120, from a point substantially above the liquid level 131, to the upper ends of the vertically extending mold passages 18 and 19 in mold 11. A valve 133 may be interposed in the inlet conduit 132 with a small pump 134 in parallel with the valve. A return conduit 135 connects the lower ends of mold passages 18 and 19 back to heat exchanger 120. Heat exchanger 120, conduits 132 and 135, and mold passages 18 and 19 afford a closed loop, as in the previous embodiment.

When system 110 is placed in operation, hot fluid from heating apparatus 124, passing through coil 121, heats the heat transfer fluid 130 in evaporator 120, vaporizing an appreciable portion of the heat transfer fluid. Pump 134 may be utilized at the outset to assure purging of conduits 132 and 135 and mold passages 18 and 19. In normal operation pump 134 is shut off and valve 133 is open. The control comprising pump 37, valve 41, sensor 42 and controller 43 establishes a predetermined pressure in the system, as before. Accumulator 138 merely serves as storage for excess heat transfer fluid 130.

System 110 functions on the same basis as system 10 except that it is employed for heating of mold 11 instead of cooling of the mold, with the heating effect based upon condensation of fluid 130 from its vapor state to its liquid state. The closed loop comprising the mold passages 18 and 19 is filled with hot heat transfer fluid 130 in its vapor state at a predetermined pressure. At any portion of the mold passages 18 and 19 below the condensation point for the gaseous heat transfer fluid, condensation occurs. Most condensation occurs at the critical portions 18A and 19A of the internal mold passages. The condensed heat transfer fluid drains, by the effect of gravity, back through return conduit 135 into exchanger 120. There is no need for active pumping of hot gas through the closed loop comprising the evaporator and the mold passages; by maintaining the system at a substantially constant pressure, the hot gaseous heat transfer fluid quickly refills the mold passages, replacing the gas that has been condensed. Thus, in system 110 as in system 10 the basic circulation is that afforded by the effect of gravity based upon a change of physical state of the heat transfer fluid within the passages of mold 11 used for cooling or heating purposes.

For system 110, as for system 10, it may be desirable to vary the closed loop pressure synchronously with the molding cycle. That is, controller 43 may be programmed to increase the pressure in the loop 120, 132, 18, 19, and 135 shortly prior to filling of cavity 16 in mold 11, with a decrease to an initial pressure level to coincide approximately with opening of the mold. The pressure/time characteristic would thus be the reverse of that shown in FIG. 2. In both cases, of course, a timing input (not shown) to controller 43 may be necessary from the mechanism actuating the mold.

From the foregoing description of FIGS. 1 and 3, it is apparent that the system embodiments of the invention all function in accordance with the same basic method, regardless of whether the mold is to be heated or cooled. Thus, for each temperature modification arrangement, the internal passages of the mold 11 are connected into a closed loop with a heat exchanger, the relative elevations of the mold in the heat exchanger being determined so that the heat transfer fluid tends to flow from the mold to the heat exchanger in response to the effect of gravity when the fluid is in a given physical state (vapor state for cooling, liquid state for heating). That closed loop is filled with a heat transfer fluid that changes from an initial physical state to the given physical state required for return to the heat exchanger in response to thermal conditions occurring in the critical portions of the mold passages; in both instances a reservoir of liquid heat transfer fluid is maintained in the heat exchanger. The heat exchanger itself is controlled to maintain a controlled pressure in the closed loop and to change the fluid back to the initial physical state required for filling the closed loop at approximately the same rate as the fluid returns from the mold to the heat exchanger. This operational control may be effected by pump 37 and valve 41, by control of the input to the heat exchanger coil, or by a combination of the two. The loop pressure may be held constant, or it may be varied in synchronism with the molding cycle.

I claim:

1. A passive cooling system for cooling a mold for molding articles of plastic material without substantial pumping, the mold including a plurality of vertically extending internal passages for passing a cooling fluid through the mold, the system comprising:

a condenser heat exchanger partially filled with a supply of cooling fluid in a liquid state, the cooling fluid constituting a fluid which changes from its liquid state to its vapor state in response to temperatures occurring in critical portions of the mold passages during operation of the mold, the heat exchanger being positioned so that the upper level of liquid fluid in the heat exchanger is approximately at or above the tip of the mold;

an inlet conduit connecting the heat exchanger, from a point below the upper level of the fluid, to the lower ends of the mold passages;

a return conduit connecting the upper ends of the mold passages back to the heat exchanger;

the heat exchanger, the mold passages, and the inlet and return conduits constituting a closed loop;

and heat exchanger control means for controlling operation of the heat exchanger to maintain a controlled pressure in the loop while condensing vaporized fluid back to its liquid state as the fluid returns from the mold to the heat exchanger;

the heat exchanger control means including means to adjust the controlled pressure to establish a minimum limit temperature for cooling of the mold and means for actuating the heat exchanger to vary the loop pressure in synchronism with the molding cycle.

2. A passive mold cooling system according to claim 1 in which the cooling fluid is water.

3. A passive mold cooling system according to claim 1 in which the cooling fluid is a Freon refrigerant.

4. A passive mold cooling system according to claim 1 in which one of the inlet and return conduits includes pump means for circulating the cooling fluid through the closed loop at a slow rate, insufficient to afford substantial cooling of the mold, to assure movement of vaporized cooling fluid back to the heat exchanger.

5. A passive mold cooling system according to claim 1 in which the heat exchanger control means further comprises:
pressure sensing means for sensing the pressure in the closed loop;
first and second inlet/outlet conduits for the heat exchanger, one including a control pump and the other a control valve;
and controller means, connected to the pressure sensing means, for actuating the control pump and the control valve in response to variations in pressure in the closed loop.

6. A passive mold cooling system according to claim 1 in which the heat exchanger includes an internal coil and the heat exchanger control means further comprises:
pressure sensing means for sensing the pressure in the closed loop;
chiller apparatus for circulating a chilled heat transfer fluid through the heat exchanger coil; and
controller means, connected to the pressure sensing means, for adjusting operation of the chiller apparatus in response to variations in pressure in the closed loop to maintain a constant pressure.

7. A passive heating system for heating a mold for molding articles of plastic material without substantial pumping, the mold including a plurality of vertically extending internal passages for passing a heating fluid through the mold, the system comprising:
an evaporator heat exchanger partially filled with a supply of heating fluid in a liquid state, the heating fluid constituting a fluid which changes from its vapor state to its liquid state in response to temperatures occurring in critical portions of the mold passages during operation of the mold, the heat exchanger being positioned so that the upper level of liquid fluid in the heat exchanger is approximately at or below the bottom of the mold;
an inlet conduit connecting the heat exchanger, from a point above the upper level of the fluid, to the upper ends of the mold passages,
a return conduit connecting the lower ends of the mold passages back to the heat exchanger;
the heat exchanger, the mold passages, and the inlet and return conduits constituting a closed loop;
and heat exchanger control means for controlling operation of the heat exchanger to vaporize fluid from the liquid supply in the heat exchanger to maintain the conduits and the mold passages filled with fluid vapor at a controlled pressure;
the heat exchanger control means including means to adjust the pressure to establish a maximum limit temperature for heating of the mold and means for actuating the heat exchanger to vary the loop pressure in synchronism with the molding cycle.

8. A passive mold heating system according to claim 7 in which the heating fluid is water.

9. A passive mold heating system according to claim 7 in which the heating fluid is a Freon refrigerant.

10. A passive mold heating system according to claim 7 in which the heat exchanger control means further comprises:
pressure sensing means for sensing the pressure in the closed loop;
first and second inlet/outlet conduits for the heat exchanger, one including a control pump and the other a control valve;
and controller means, connected to the pressure sensing means, for actuating the control pump and the control valve in response to variations in pressure in the closed loop to maintain a constant pressure.

11. A passive mold heating system according to claim 7 in which the heat exchanger includes an internal coil and the heat exchanger control means further comprises:
pressure sensing means for sensing the pressure in the closed loop;
heater apparatus for circulating a heated heat transfer fluid through the heat exchanger coil; and
controller means, connected to the pressure sensing means, for adjusting operation of the heater apparatus in response to variations in pressure in the closed loop to maintain a constant pressure.

* * * * *